US008196159B2

(12) United States Patent
Jeong

(10) Patent No.: US 8,196,159 B2
(45) Date of Patent: Jun. 5, 2012

(54) TERMINAL AND METHOD OF CONTROLLING BROADCASTING THEREIN

(75) Inventor: Yong Chan Jeong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 794 days.

(21) Appl. No.: 12/327,705

(22) Filed: Dec. 3, 2008

(65) Prior Publication Data

US 2009/0249385 A1 Oct. 1, 2009

(30) Foreign Application Priority Data

Mar. 27, 2008 (KR) ........................ 10-2008-0028442

(51) Int. Cl.
*H04N 7/16* (2011.01)

(52) U.S. Cl. ................ 725/29; 725/8; 725/27; 725/104; 455/3.06; 455/411; 455/414.1

(58) Field of Classification Search ........................ None
See application file for complete search history.

(56) References Cited

U.S. PATENT DOCUMENTS

2005/0125822 A1* 6/2005 Casement et al. .............. 725/30
2007/0072543 A1* 3/2007 Paila et al. .................... 455/3.06
2007/0256092 A1* 11/2007 Chung et al. .................... 725/25
2008/0115224 A1* 5/2008 Jogand-Coulomb et al. ... 726/27
2010/0138884 A1* 6/2010 Lau .............................. 725/104

FOREIGN PATENT DOCUMENTS

CN 1416262 5/2003
CN 1529984 9/2004
CN 101114986 1/2008

* cited by examiner

*Primary Examiner* — Dominic D Saltarelli
*Assistant Examiner* — Jason J Chung
(74) *Attorney, Agent, or Firm* — Lee, Hong, Degerman, Kang & Waimey

(57) ABSTRACT

An apparatus and method for previewing broadcasting data on a mobile terminal are provided. When a user selected broadcast channel is an authority-restricted channel, data associated with the selected broadcast channel is output according to a presence or non-presence of a preview authority for the selected broadcast channel.

14 Claims, 14 Drawing Sheets

TERMINAL AND METHOD OF CONTROLLING BROADCASTING THEREIN

CROSS-REFERENCE TO RELATED APPLICATIONS

Pursuant to 35 U.S.C. §119(a), this non-provisional patent application claims the benefit of the earlier filing date and right of priority of Patent Application No. 10-2008-0028442 filed in Republic of Korea on Mar. 27, 2008, the entire contents of which are hereby incorporated by reference.

FIELD OF THE INVENTION

The present invention is directed to a mobile terminal, and specifically to a method for controlling broadcasting in a mobile terminal provided with a broadcast receiving function.

DESCRIPTION OF RELATED ART

In general, a mobile terminal is a device that can be carried and performs one or more functions, such as data and voice call communications, inputting and outputting information and storing data. Mobile terminals have been implemented as a multimedia player or device supporting more complicated functions in order to provide more diversified functions, such as capturing images or video via a camera, recording audio, playing music files via a speaker system, and displaying images and video on a display. Other improvements to mobile terminals include additional functions that support playing games.

Numerous improvements have been implemented in hardware or software in order further increase the functionality of mobile terminals. Improvements to the structural components forming the mobile terminal have also been implemented.

For example, mobile terminals have been configured for allowing a user to select and receive broadcast and multicast signals which permit viewing of broadcast content, such as videos and television programs.

According to prior art, if an authority restricted broadcast channel is selected, a broadcast mobile terminal displays an image for a user's channel purchase. If an authority recognized channel is selected, the related art broadcast terminal is able to output broadcast data provided from the selected channel.

The authority restricted channel refers to a pay channel that is not purchased by a mobile terminal. The authority recognized channel refers to a pay-free channel or a pay channel purchased by a mobile terminal.

However, prior art mobile terminals do not display channel information for authority restricted channels. Therefore, a direct user purchase is required.

SUMMARY OF THE INVENTION

In one aspect of the present invention, a mobile terminal for previewing broadcast data is provided. The mobile terminal includes a user input unit configured for selecting a broadcast channel, an output unit for outputting data, a first identity device configured for storing information associated with a user's preview authority, and a controller for determining whether preview authority exists in the first identity device for the selected channel and controlling the output unit to output preview data when the selected broadcast channel is authority restricted and preview authority exists.

It is contemplated that the controller controls the output unit to output data associated with the selected broadcast channel for a predetermined time when the preview authority exists. It is further contemplated that the authority restricted channel includes a pay channel not purchased.

It is contemplated that the preview authority includes an authority for providing age-restricted data associated with the selected broadcast channel according to a viewing age restriction. It is further contemplated that the data associated with the selected broadcast channel includes at least one of broadcast data currently provided on the selected broadcast channel or contents separately produced for previewing a preview.

It is contemplated that the controller controls the output unit to display an image for a purchase of the selected broadcast channel if the preview authority does not exist. It is further contemplated that the controller controls the output unit to display an image for a purchase of the selected broadcast channel after the predetermined time.

It is contemplated that the controller determines whether a broadcast viewing authority for the selected broadcast channel exists if the selected broadcast channel is not an authority restricted channel, and controls the output unit to output broadcast data provided for the selected broadcast channel if broadcast viewing authority exists. It is further contemplated that the mobile terminal further includes a second identity device configured to manage the broadcast viewing authority.

It is contemplated that at least one of the first or second identity devices is detachably attached to the mobile terminal. It is further contemplated that the controller controls the output unit to display a broadcast channel list indicating a presence or non-presence of an authority-restricted channel for at least one broadcast channel, wherein the user input unit facilitates selection of one of the at least one broadcast channels displayed on the list.

It is contemplated that the mobile terminal further includes a wireless communication unit for receiving data associated with broadcast information and authority-restricted channel information, wherein the controller determines the presence or non-presence of an authority restriction for each of the at least one broadcast channel using the received data associated with the authority restricted broadcast channel information and information indicating a presence or non-presence of a purchased broadcast channel.

In another aspect of the present invention, a mobile terminal for previewing broadcast data is provided. The mobile terminal includes a user input unit for selecting a broadcast channel, an output unit for outputting data, and a controller for outputting broadcast data currently provided on the selected broadcast channel when a preview function is selected via the user input unit, wherein the broadcast data is output for a predetermined time.

In another aspect of the present invention, a method for previewing broadcast data on a mobile terminal is provided. The method includes selecting a broadcast channel, receiving information associated with an authority restricted channel, determining whether a per channel authority restriction exists, determining whether the selected broadcast channel is authority-restricted, receiving information associated with a preview authority when the selected broadcast channel is authority-restricted, and outputting data associated with the selected channel for a predetermined time when the preview authority exists.

It is contemplated that the method further includes displaying an image for purchase of the selected broadcast channel if the preview authority does not exist. It is further contemplated that the method further includes displaying an image for purchase of the selected broadcast channel after the predetermined time expires.

It is contemplated that the method further includes receiving information associated with a broadcast viewing authority, determining whether a broadcast viewing authority exists for the selected broadcast channel if the selected broadcast channel is not authority-restricted, outputting broadcast data associated with the selected broadcast channel if the broadcast viewing authority exists, and determining that the selected broadcast channel is authority-restricted if the broadcast viewing authority does not exist. It is further contemplated that each of the information associated with the preview authority and the information associated with the broadcast viewing authority is individually managed by an identity device.

It is contemplated that the method further includes displaying a broadcast channel list including at least one broadcast channel, in which a presence or non-presence of the authority-restricted channel is indicated for the at least one broadcast channel, and receiving a selection of one of the at least one broadcast channels displayed on the broadcast channel list. It is further contemplated that the method further includes determining a presence or non-presence of an authority restriction per channel using the received data and information indicating a presence or non-presence of a purchased channel, and constructing the broadcast channel list based on the received information and the authority restriction determination.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE INVENTION

In the following detailed description reference is made to the accompanying drawing figures which form a part hereof, and which show, by way of illustration, specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
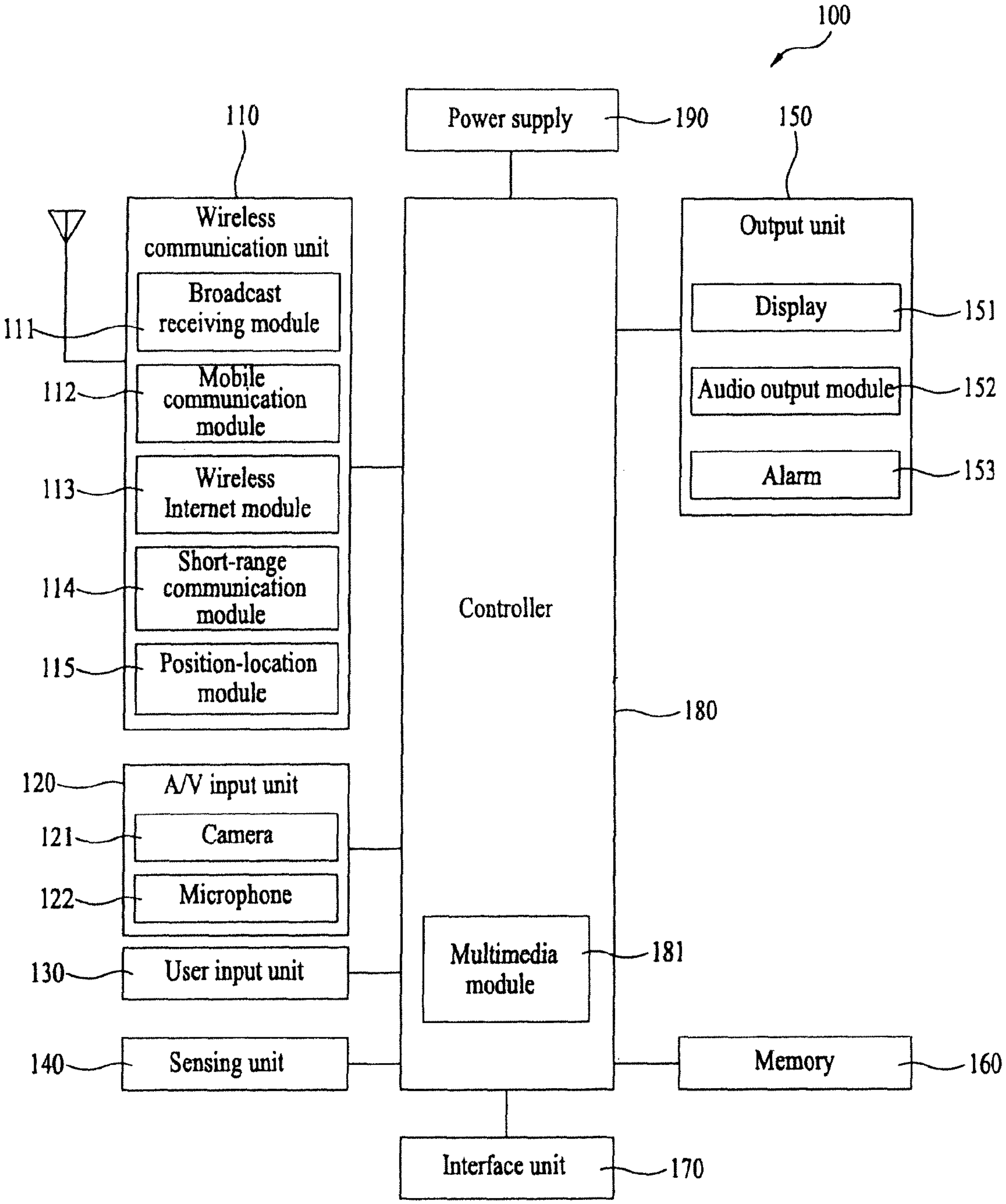
FIG. 1 is a block diagram illustrating a configuration of a mobile terminal according to an embodiment of the present invention.

FIG. 1 is a block diagram of a mobile terminal 100 in accordance with an embodiment of the present invention. The mobile terminal 100 may be implemented using a variety of different of types of terminals. Examples of such terminals include mobile phones, user equipment, smart phones, computers, digital broadcast terminals, personal digital assistants, portable multimedia players (PMP), and navigators.

By way of non-limiting example only, further description will be provided with regard to a mobile terminal 100. However, those skilled in the art will appreciate that such teachings apply equally to other types of mobile terminals as well. FIG. 1 illustrates the mobile terminal 100 having various components, but it is understood that implementing all of the illustrated components is not a requirement. More or less components may alternatively be implemented.

FIG. 1 illustrates a wireless communication unit 110 configured with several commonly implemented components. For example, the wireless communication unit 110 typically includes one or more components which permit wireless communication between the mobile terminal 100 and a wireless communication system or network in which the mobile terminal is located.

The broadcast receiving module 111 receives a broadcast signal and/or broadcast associated information from an external broadcast managing entity via a broadcast channel. The broadcast channel may include a satellite channel and a terrestrial channel, The broadcast managing entity refers generally to a system that transmits a broadcast signal and/or broadcast associated information.

Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various broadcast systems. By way of non-limiting examples, such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module may be internally or externally coupled to the mobile terminal 100.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position location module may be implemented using global positioning system (GPS) components which cooperate with associated satellites, network components, and combinations thereof.

The audio/video (A/V) input unit 120 is configured to provide audio or video signal input to the mobile terminal 100. As illustrated, the A/V input unit 120 includes a camera 121 and a microphone 122.

The camera 121 receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of the communication unit 110. Two or more microphones and/or cameras may be used.

The user input unit 130 generates input data responsive to user manipulation of an associated input device or devices. Examples of such devices include a keypad, a dome switch, a jog wheel and a jog switch, and a touchpad such as static pressure/capacitance. A specific example is one in which the user input unit 130 is configured as a touchpad in cooperation with a touch screen display, which will be described in more detail below.

The sensing unit 140 provides status measurements of various aspects of the terminal. For example, the sensing unit 140 may detect an open/close status of the mobile terminal 100, relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be configured as a slide-type mobile terminal and the sensing unit 140 may sense whether a sliding portion of the terminal is open or closed. The sensing unit 140 may also sense the presence or absence of power provided by the power supply 190, the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures. The interface unit 170 may be configured using a wired/wireless data port, audio input/output ports and video input/output ports, a card socket for coupling to a memory card and a device equipped with an identity module.

The identity module includes a chip in which various kinds of information for identifying or authenticating a use authority of the terminal 100 are stored, The identity module may include one of a user identity module (UTM), a subscriber identity module (SIM), or a universal subscriber identity module (USIM). Particularly, the identity module may include a module for identifying or authenticating an authority for purchasing and/or viewing a broadcast using the mobile terminal 100.

A device having an identity module, hereinafter referred to as an identity device, may be provided as a smart card. Therefore, the identity device can be connected to the mobile terminal 100 via a port for connecting the identity device and the mobile terminal 100.

The output unit 150 may include various components that support the output requirements of the mobile terminal 100. The display 151 is typically implemented to visually display information associated with the mobile terminal 100. For example, the display 151 may provide a user interface or graphical user interface that includes information associated with placing, conducting, and terminating a phone call if the mobile terminal 100 is operating in a phone call mode. As another example, the display 151 may additionally or alternatively display images that are associated with a video or photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the mobile terminal is in an opened position and a second display configured as an external display viewable in both the open and closed positions.

FIG. 1 further illustrates the output unit 150 having an audio output module 152 which supports the audio output requirements of the terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as 'call received', 'message received', and 'errors'.

The output unit 150 is further shown having an alarm 153, which may signal or otherwise identify the occurrence of a particular event associated with the terminal. Typical events include receiving a call, message or user input.

An example of a signal provided by the output unit 150 is a tactile sensation, such as a vibration, to a user. For example, the alarm 153 may be configured to vibrate responsive to the mobile terminal 100 receiving a call or message. As another example, vibration may be provided by the alarm 153 responsive to receiving user input at the mobile terminal 100, in order to provide a tactile feedback mechanism. It is understood that the various outputs provided by the components of the output unit 150 may be separately performed, or performed using any combination of such components.

The memory 160 is generally used to store various types of data to support the processing, control, and storage requirements of the mobile terminal 100. Examples of such data include program instructions for applications operating on the terminal, contact data, phonebook data, messages, pictures, and video.

The memory 160 illustrated in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, or other similar memory or data storage device.

The controller 180 typically controls the overall operations of the mobile terminal 100. For example, the controller 180 performs the control and processing associated with voice calls, data communications, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals 100.

Figure 2A:
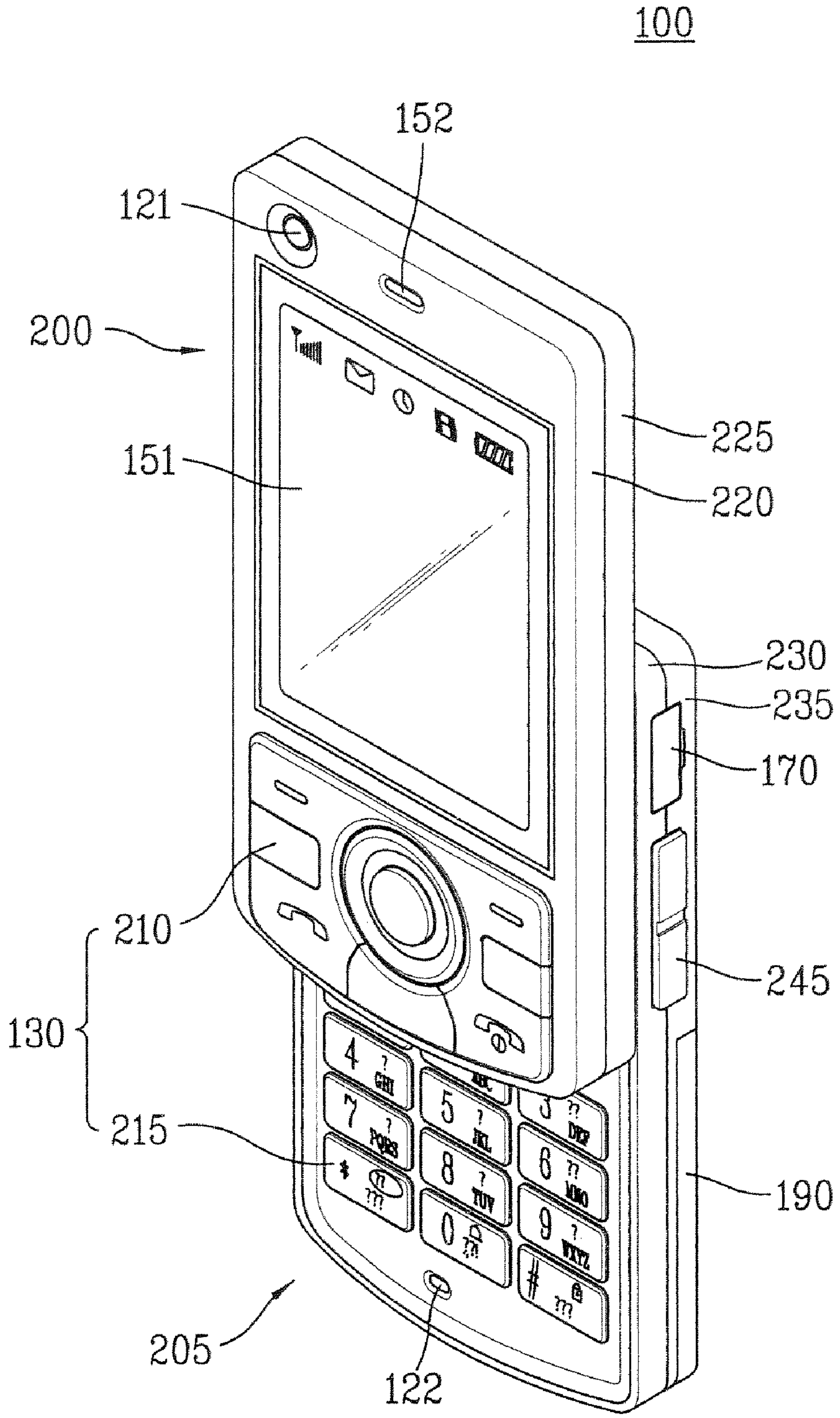
FIG. 2A illustrates a perspective view of a front side of a mobile terminal according to one embodiment of the present invention.

FIG. 2A is a perspective view of a front side of a mobile terminal according to an embodiment of the present invention. In FIG. 2A, the mobile terminal 100 is illustrated having a first body 200 configured to slideably cooperate with a second body 205.

The user input unit 130 (depicted in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to second body 205 between open and closed positions. The first body 200 is positioned over the second body 205 in the closed position such that the keypad 215 is substantially or completely obscured by the first body 200. User access to the keypad 215, the display 151 and the function keys 210 is facilitated in the open position. The function keys 210 are conveniently configured for a user to enter commands, such as 'start', 'stop' and 'scroll'.

The mobile terminal 100 is operable in either a standby mode or an active call mode. The mobile terminal 100 is able to receive a call or message and to receive and respond to network control signaling in the standby mode. The mobile terminal 100 typically operates in the standby mode in the closed position, and in the active mode when in the open position. This mode configuration may be changed as required or desired.

The first body 200 is formed of a first case 220 and a second case 225. The second body 205 is formed of a first case 230 and a second case 235. The first case 220 and second case 225 of the first body 200 and the first case 230 and second case 235 or the second body 205 are usually formed of a suitably ridge material, such as injection molded plastic, or formed using metallic material, such as stainless steel (STS) and titanium (Ti).

One or more intermediate cases may be provided between the first case 220 and second case 225 of the first body 200 or the first case 220 and second case 225 of the second body 205. The first body 200 and second body 205 are typically sized to receive electronic components necessary to support operation of the mobile terminal 100.

The first body 200 is shown having a camera 121 and audio output unit 152, which is configured as a speaker, positioned relative to the display 151. The camera 121 may be constructed in such a manner that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215, and side keys 245, which are one type of input unit 130, positioned along the side of second body 205. Preferably, the side keys 245 may be configured as hot keys, such that the side keys are associated with a particular function of the mobile terminal 100.

An interface unit 170 is shown positioned adjacent to the side keys 245. A power supply 190 in a form of a battery is located on a lower portion of the second body 205.

Figure 2B:
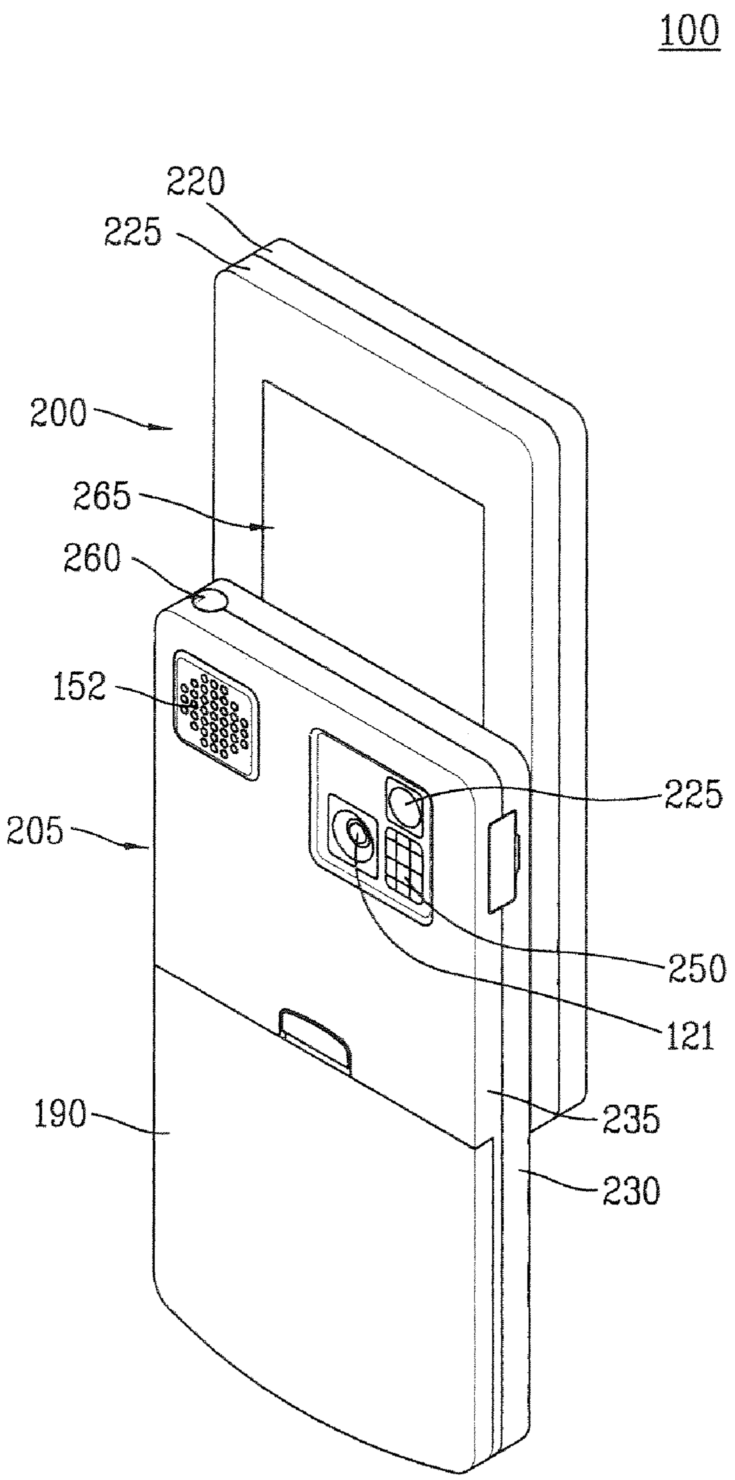
FIG. 2B illustrates a rear view of the mobile terminal of FIG. 2A.

FIG. 2B is a rear view of the mobile terminal shown in FIG. 2A. FIG. 2B illustrates the second body 205 having a camera 121 with an associated flash 250 and mirror 255. The flash operates in conjunction with the camera 121. The mirror 255 is useful for assisting a user to position camera 121 in a self-portrait mode.

The camera 121 of the second body 205 illustrated in FIG. 2B faces a direction opposite to a direction faced by camera 121 of the first body 200 illustrated in FIG. 2A. Each of the cameras 121 of the first body 200 and second body 205 may have the same or different capabilities.

The camera 121 of the first body 200, in one embodiment, operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 2B also includes an audio output module 152 located on an upper side of the second body and configured as a speaker. The audio output modules 152 of the first body 200 and second body 200, 205 may cooperate to provide stereo output. Moreover, either or both of these audio output modules may be configured to operate as a speakerphone.

A broadcast signal receiving antenna 260 is shown located at an upper end of the second body 205 in FIG. 2B. The antenna 260 functions in cooperation with the broadcast receiving module 111 illustrated in FIG. 1. The antenna 260 may be fixed or retractable into the second body 205.

The rear side of the first body 200 includes slide module 265. The slide module 265 slideably couples with a corresponding slide module (not shown) located on the front side of the second body 205.

It is understood that the illustrated arrangement of the various components of the first body 200 and second body 205 illustrated in FIGS. 2A and 2B may be modified as required or desired. For example, some or all of the components of one body may alternatively be implemented on the other body. Further, the location and relative positioning of the components are not critical, and therefore, the components may be positioned at locations that differ from those shown in FIGS. 2A and 2B.

Figure 3A:
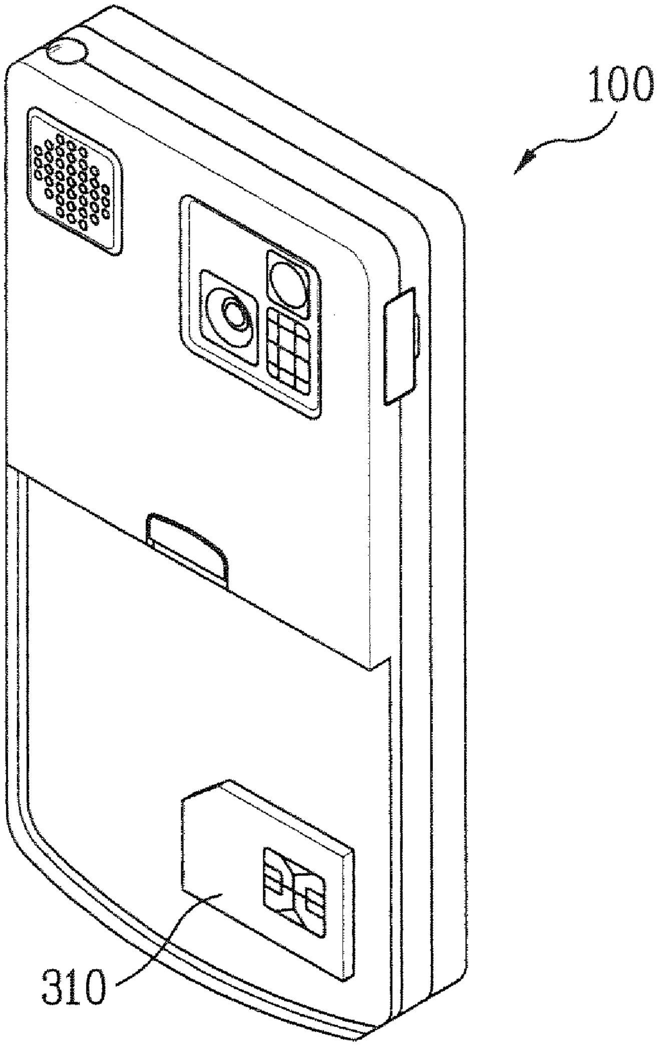
FIGS. 3A and 3B illustrate diagrams for attaching/detaching an identity device to/from a mobile terminal according to one embodiment of the present invention.
Figure 3B:
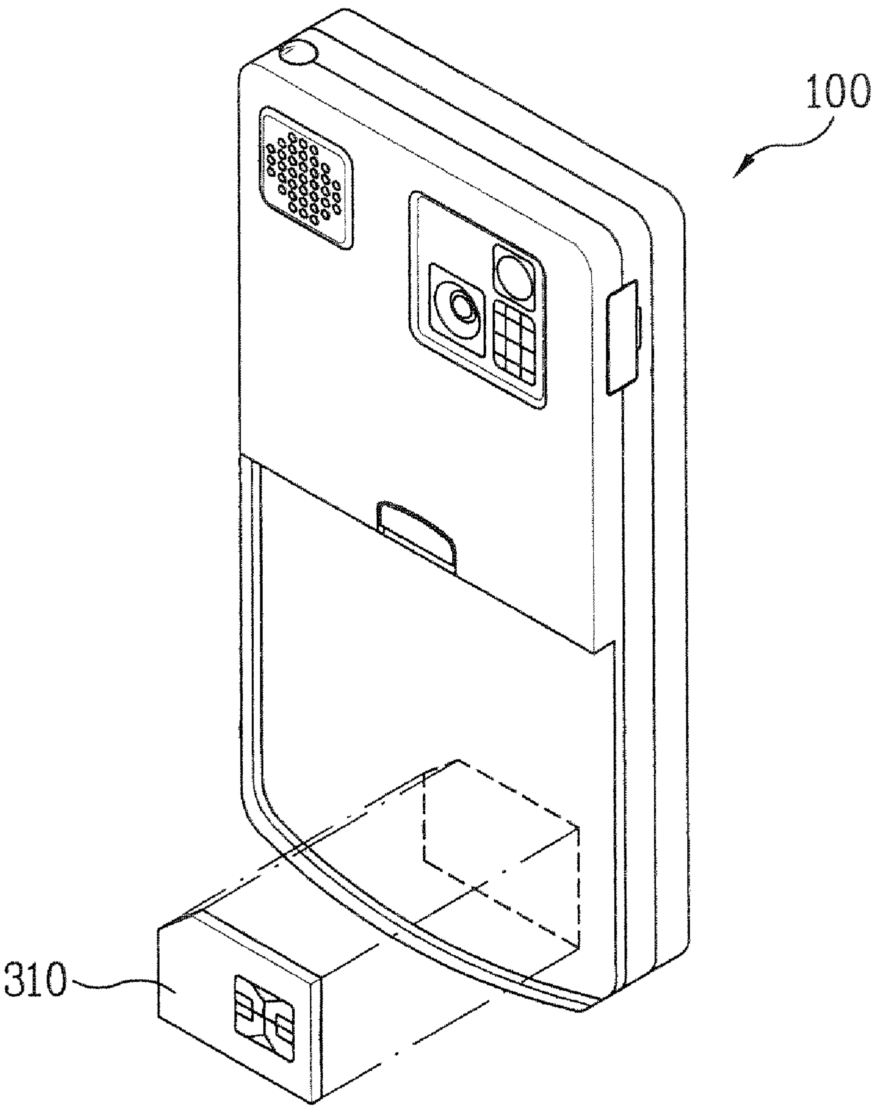

FIG. 3A and FIG. 3B illustrate diagrams for attaching/detaching an identity device 310 to/from a terminal according to one embodiment of the present invention. The identity device 310 may include a SIM card.

Referring to FIGS. 3A and 3B, the identity device 310 is detachably attached to the mobile terminal 100. Therefore, a first identity device 310 attached to the mobile terminal 100 can be replaced by a second identity device 310. The identity device 310 can be loaded in the terminal 100 by as part of the interface unit 170. Alternatively, the identity device 310 can be attached to the mobile terminal 100 via a connector separately provided.

A connecting means, not shown in the drawings, for connecting the identity device 310 and the mobile terminal 100 can be attached to any part of the terminal 100, such as a backside, a lateral side, or a front side.

The mobile terminal 100 illustrated in FIGS. 1 to 3B can be operable with a communication system capable of transmitting data via frames or packets, such as a wire/wireless communication system, or a satellite based communication system.

The mobile terminal 100 of FIGS. 1-3B may be operable within a communication system which transmits data via frames or packets, including both wireless and wired communication systems, and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
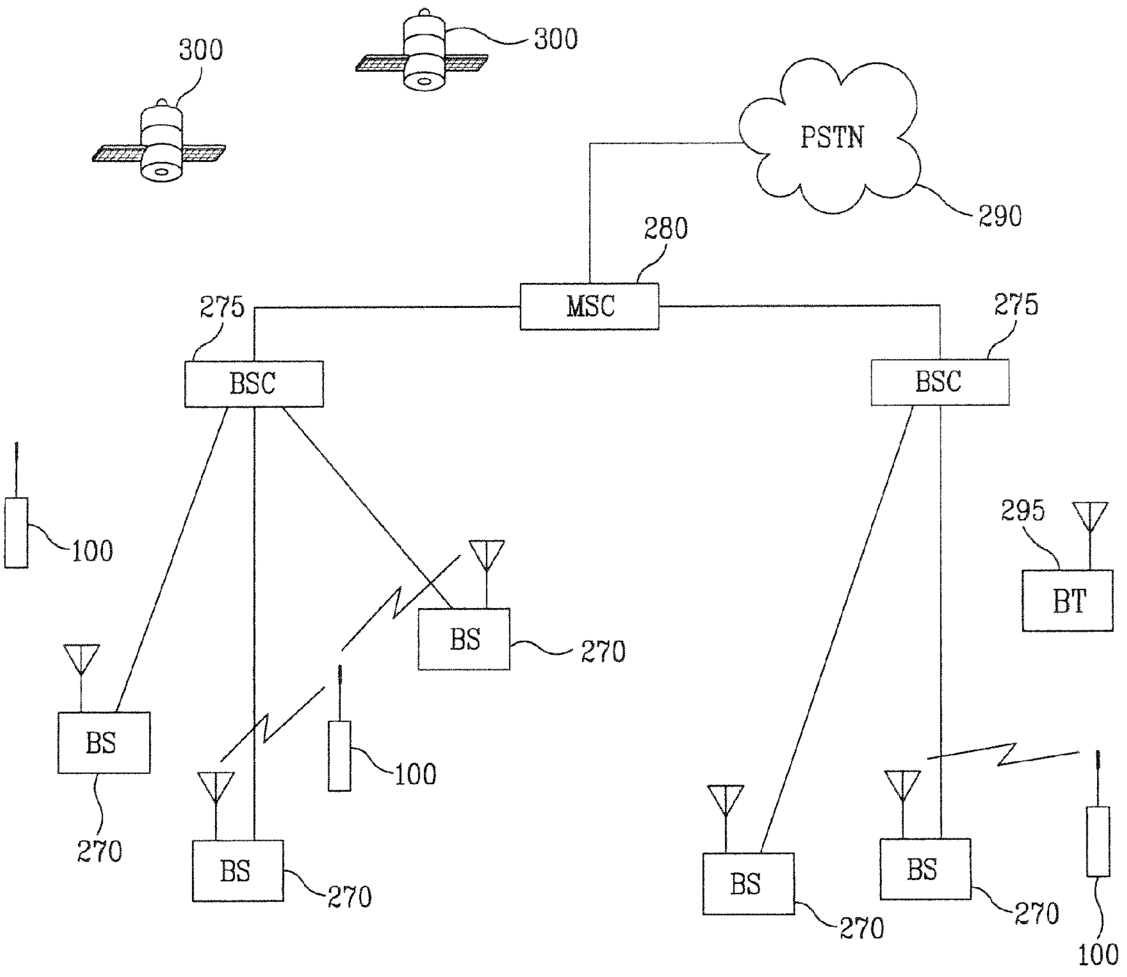
FIG. 4 is a block diagram of a Code Division Multiple Access (CDMA) wireless communication system operable with the mobile terminal illustrated in FIGS. 1 to 3B.

Referring now to FIG. 4, a CDMA wireless communication system is shown having a plurality of terminals 100, a plurality of base stations 270, base station controllers (BSCs) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The base stations 270 may also be referred to as base station transceiver subsystems (BTSs).

The term “base station” may be used to refer collectively to a BSC 275, and one or more base stations 270. The BSs 270 may also be denoted “cell sites.” Alternatively, individual sectors of a given base station 270 may be referred to as “cell sites.”

A BT 295 is shown broadcasting to mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the terminals 100. Two satellites are depicted, but it is understood that useful positioning information may be obtained with greater or fewer satellites.

The position-location module 115 illustrated in FIG. 1 of the mobile terminal 100 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The terminals 100 may be engaging in calls, messaging, and other communications.

Each reverse-link signal received by a given base station 270 is processed within that base station. The resulting data is forwarded to an associated BSC 275.

The BSC provides call resource allocation and mobility management functionality including the orchestration of soft handoffs between BSs 270. The BSCs 275 also route the received data to the MSC 280, which provides additional routing services for interfacing with the PSTN 290.

Similarly, the PSTN interfaces with the MSC 280, which interfaces with the BSCs 275. The BSCs 275 control the BSs 270 to transmit sets of forward-link signals to the mobile terminals 100.

Figure 5:
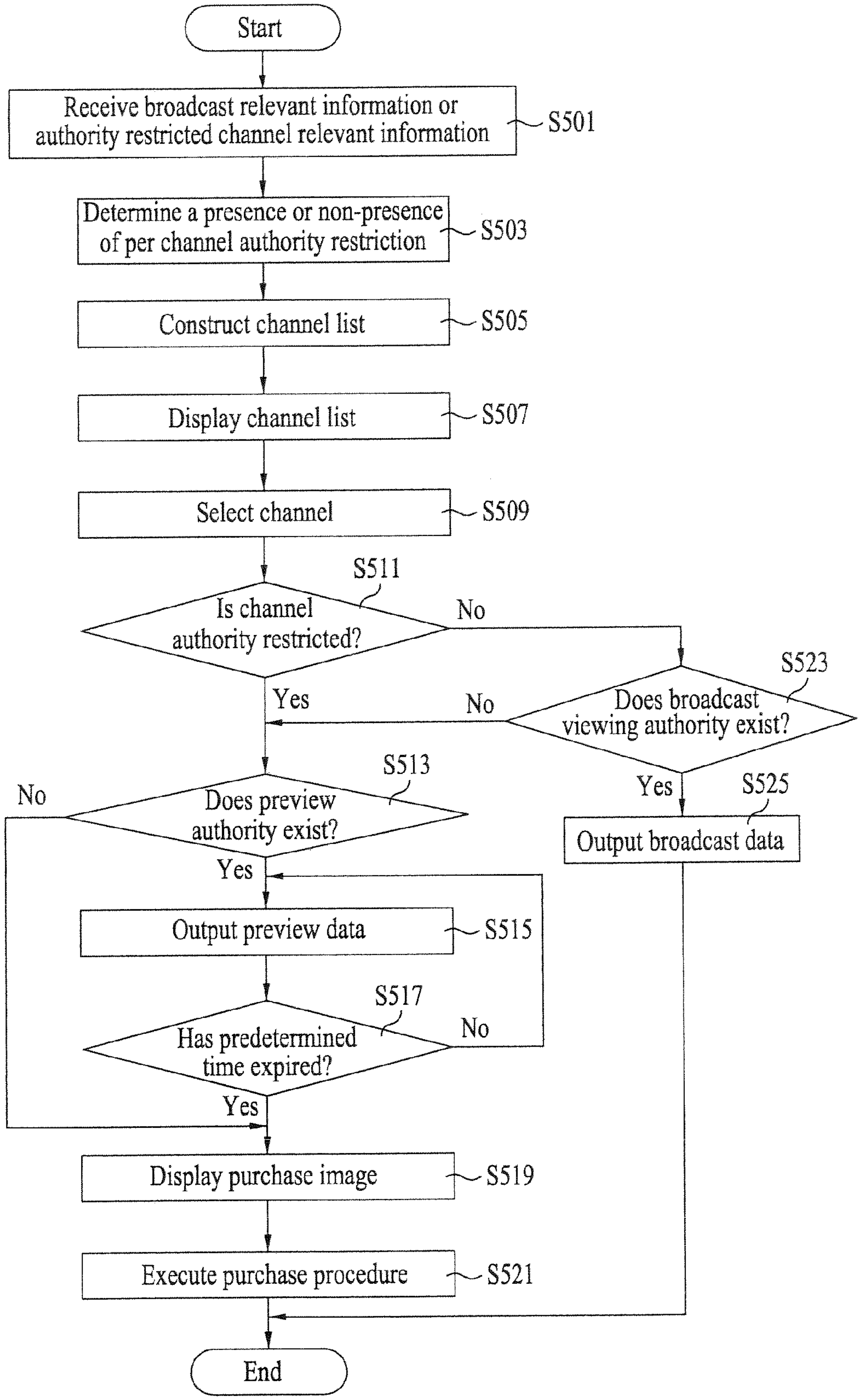
FIG. 5 is a flowchart illustrating a method of controlling broadcasting in a mobile terminal according to one embodiment of the present invention.

For clarity and convenience of explanation, the mobile terminal 100 mentioned in the following description can include at least one of the elements shown in FIG. 1. Steps of a method of controlling broadcasting in a mobile terminal according to one embodiment of the present invention are explained with reference to FIG. 5. FIG. 5 illustrates a method for controlling broadcasting in a mobile terminal according to one embodiment of the present invention.

Referring to FIG. 5, the mobile terminal receives at least one of broadcast relevant information and authority restricted channel relevant information via the wireless communication unit 110 (S501). The received broadcast relevant information or the authority restricted channel relevant information may be stored in the memory 160.

The mobile terminal 100 receives broadcast relevant information or authority restricted channel relevant information via one of a broadcasting network, a mobile communication network, a data network, or a short-range communication network (S501).

The mobile terminal 100 uses the broadcast receiving module 111 for the reception via the broadcasting network, the mobile communication module 112 for the reception via the mobile communication network, the wireless Internet module 113 for the reception via the data network, or the short-range communication module 114 for the reception via the short-range communication network.

The broadcast relevant information is information associated with a broadcast program or a broadcast channel and may include program/channel identification information, program/channel name, per channel program organization information, per program interactive service information, or per program broadcast time/broadcast content/character information. For example, the broadcast relevant information can be provided using an electronic program guide (EPG) of DMB or an electronic service guide (ESG) of DVB-H.

The authority restricted channel relevant information can include per channel authority restriction/recognition information or channel purchase information for authority restriction release. For example, the authority restricted channel relevant information can be provided using private data.

It is assumed that, the authority restricted channel relevant information contains information indicating whether each channel is a pay channel or a pay-free channel in order to determine a presence or non-presence of authority restriction. The authority restricted channel is able to set factors for restricting authority on a channel, such as a presence or non-presence of pay/free channel, and a channel viewing age.

Using the authority restricted channel relevant information and information indicating whether a prescribed channel was purchased, the mobile terminal 100 determines whether to restrict authority per channel (S503). The determination (S503) can be performed by the controller 180.

For example, if a prescribed channel is 'pay-free channel' based on the authority restricted channel relevant information, the mobile terminal 100 is able to determine that the prescribed channel is a channel authority non-restricted channel (hereinafter named 'authority recognized channel'). If a prescribed channel is 'pay channel' based on the authority restricted channel relevant information and the prescribed channel is 'purchased channel' based on the information indicating whether the prescribed channel was purchased, the mobile terminal 100 is able to determine that the prescribed channel is an authority recognized channel.

According to the result in the determination (S503), the mobile terminal 100 constructs a channel list using the received broadcast relevant information (S505). The channel list can be constructed (S505) by the controller 180. The channel list refers to a list constructed with at least one channel indicated as a per-channel authority restricted channel or a per-channel authority recognized channel.

The mobile terminal 100 displays the constructed channel list on a screen via the display 151 (S507). For example, the channel list can contain information indicating a presence or non-presence of an authority restricted/recognized channel per channel, a channel name, a title of a program currently provided per channel, or a title of a previous/next broadcast program per channel.

Figure 6A:
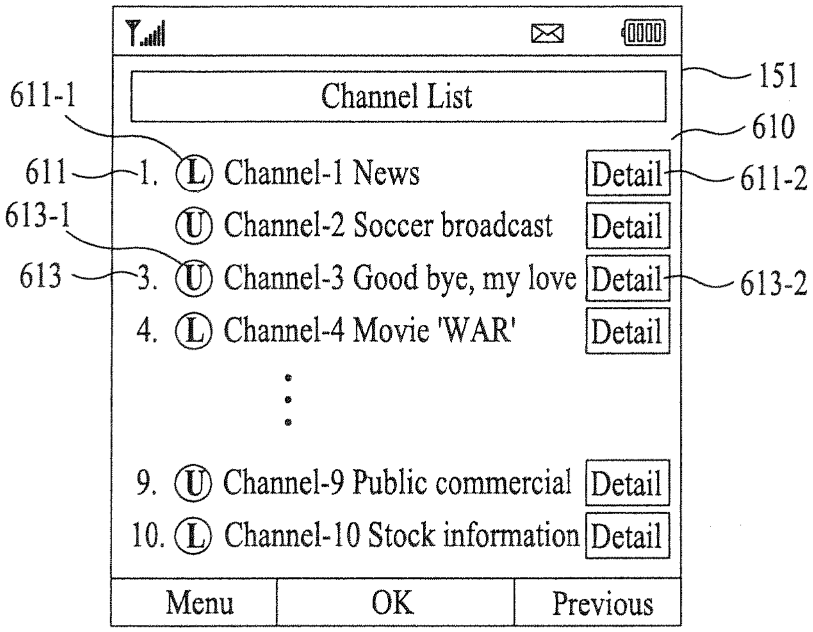
FIGS. 6A to 6C are views of screens displaying channel lists according to an embodiment of the present invention.
Figure 6B:
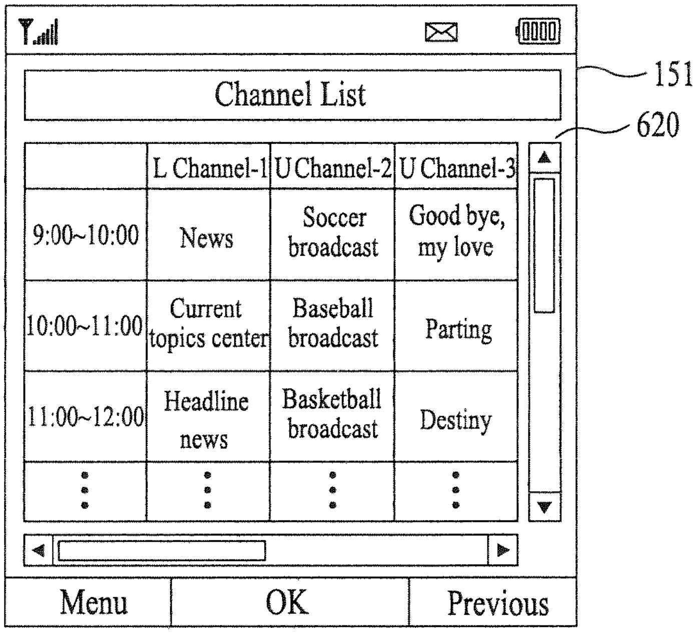
Figure 6C:
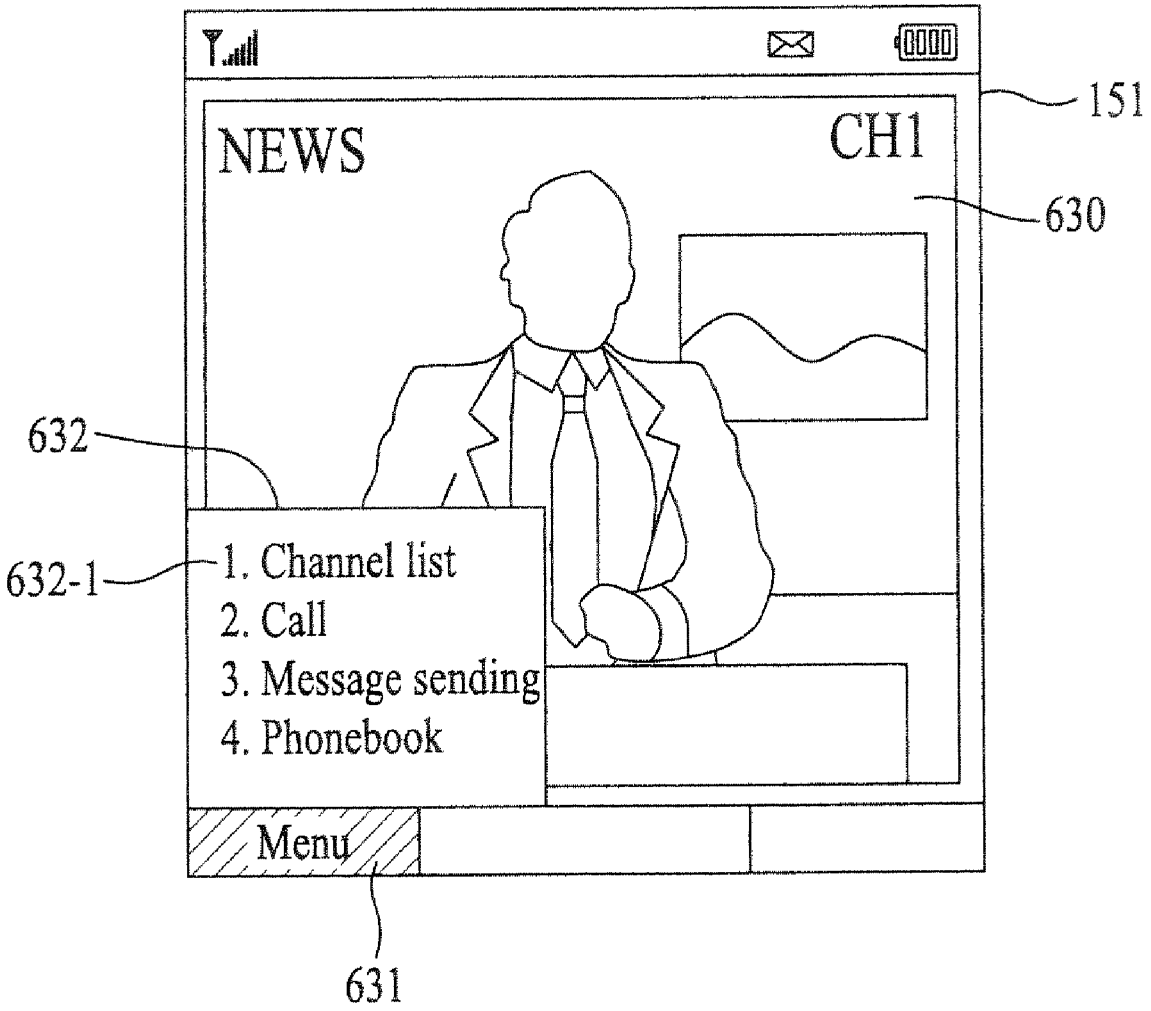

Displaying the channel list is explained in detail with reference to FIGS. 6A to 6C. FIGS. 6A to 6C are views of screens displaying a channel list according to the present invention.

Referring to FIG. 6A, the mobile terminal 100 displays a channel list 610 constructed with a plurality of channels on the screen of the display 151. The channel list 610 can contain an identification indicator indicating a presence or non-presence of an authority restricted/recognized channel per channel, channel names, and a title of a program currently provided per channel. The identification indicator can be displayed using an icon, a symbol, an image, or text.

For example, an identification indicator 'L' 611-1 indicating a presence of an authority restricted channel, a channel name 'Channel-1', and a title 'News' of a currently provided program can be displayed for a first channel. An identification indicator 'U' 613-1 indicating a presence of an authority recognized channel, a channel name 'Channel-3', and a title 'Good bye, my love' of a currently provided program can be displayed for a third channel.

If 'Detail' 611-2 and 613-2 displayed together with, respectively, the first and third channel is selected, broadcast organization information on the corresponding channel can be displayed.

Referring to FIG. 6B, the mobile terminal 100 displays a channel list on the screen using broadcast organization information table 620. An identification indicator ('L' or 'U') indicating whether a prescribed channel is an authority restricted channel or an authority recognized channel can be displayed per channel on the broadcast organization table 620.

The mobile terminal 100 can display the authority restricted channel or the authority recognized channel such that the authority restricted channel and the authority recognized channel may be distinguished from each other by using a text font, a text color, a background color, a background shape, blinking, brightness, or a box indication. Various methods are available for the identification indicator of the authority restricted channel or the authority recognized channel.

Referring to FIG. 6C, if 'Channel list' 632-1 is selected from the displayed menu items while a broadcast is output, the terminal 100 displays the channel list 610 or the broadcast organization table 620 shown in FIG. 6A or FIG. 6B. The mobile terminal 100 displays the channel list 610 or the broadcast organization table 620 using PIP or pop-up window while maintaining the broadcast output.

Referring now to FIG. 5, a prescribed channel is selected in the mobile terminal 100 to correspond to an action of channel selection made by a user using the user input unit 130 (S509). For example, the channel selection action can include selection of a numeral key corresponding to a number assigned to a channel and/or manipulation of a direction key for a previous/next channel selection.

Selection of the channel (S509) may be by selection of a previous/next channel using a direction key while outputting a broadcast, or by selection using the channel list 610 or the broadcast organization table 620 in FIG. 6A or FIG. 6B.

The mobile terminal 100 determines whether or not the selected channel is the authority restricted channel (S511). The determination (S511) can be performed by the controller 180.

Since the information indicating whether a prescribed channel is an authority restricted channel or an authority recognized channel per channel is managed by the identity device 310, the controller 180 performs the determination (S511) using the information provided by the identity device 310.

If it is determined that the selected channel is the authority restricted channel (S511), the mobile terminal 100 determines whether a preview authority for the selected channel exists (S513). The determination (S513) can be performed by the controller 180. Alternatively, the determination (S513) can be omitted.

If a preview function is selected by a user via the user input unit 130, the mobile terminal 100 determines the preview authority for the selected channel. The preview authority refers to a viewing authority for channel associated data to facilitate a user's purchase of the authority restricted channel.

If the selected channel is a viewing age restricted channel, the preview authority can include an authority for providing a user with data associated with the selected channel only. This is to allow users of viewing-restricted ages to have the preview authority for the viewing age restricted channel.

The mobile terminal 100 can be provided with a first separate identity device 310, for managing the preview authority for the selected channel. Therefore, the controller 180 is able to perform the determination (S513) using the per-channel preview authority information provided by the separate identity device 310. The separate identity device 310 can be detachably provided to the mobile terminal 100 or a conditional access system (CAS) driving module can be loaded in the mobile terminal.

If it is determined that the preview authority exists (S513), the mobile terminal 100 outputs data relevant to the selected channel, hereinafter referred to as channel relevant data, for a prescribed duration through the output unit 150 (S515). The channel relevant data may be data provided to facilitate a user's purchase of the authority restricted channel.

For example, the channel relevant data can contain broadcast data for a prescribed duration which is currently provided on a corresponding channel. Since a user is provided with real-time broadcast data substantially provided on a selected channel, the user can effectively purchase a channel. The channel relevant data can contain contents separately produced to facilitate the user's purchase of the authority restricted channel.

When the determination (S513) is omitted and a preview function is selected by a user via the user input unit 130, the terminal 100 outputs the broadcast data currently provided on the selected channel for a predetermined time or predetermined duration via the output unit 150 (S515). Therefore, if the preview function is selected, the user can be provided with the real-time broadcast data of the channel to purchase regardless of a presence or non-presence of the preview authority.

Subsequently, the mobile terminal 100 determines whether the predetermined time for the output of the channel associated data has expired (S517). The determination (S517) can be performed by the controller 180.

If the predetermined time has expired, the mobile terminal 100 displays an image for the purchase of the selected channel via the display 151 (S519). Various kinds of information, such as a channel name, a channel available period, a channel purchase amount, and channel information can be represented on the image for the channel purchase.

The channel purchase is selected through the displayed purchase image (S519) and the mobile terminal 100 executes a channel purchase procedure (S521).

If the selected channel is determined to be the authority recognized channel (S511), the mobile terminal 100 determines whether a broadcast viewing authority exists for the selected channel (S523). The broadcast viewing authority refers to a substantially valid authority for broadcast viewing of the channel determined as the authority recognized channel. For example, if a private data error takes place, such that the channel purchased information fails to match private data or a channel use period expires, the broadcast viewing authority may not exist despite the authority recognized channel may rise.

The mobile terminal 100 may include a second separate identity device 310 for managing a broadcast viewing authority for selected channels. The controller 180 is able to perform the determination (S523) using per-channel broadcast viewing authority information provided by the second separate identity device 310. The second separate identity device 310 can be detachably provided to the mobile terminal 100 and at last one of UIM, SIM and USIM can be loaded therein.

The first and second separate identity devices 310 can be provided separate from each other or can be provided together in a single separate identity device.

It is determined that the broadcast viewing authority exists (S523), the mobile terminal 100 outputs broadcast data provided on the selected channel via the output unit 150 (S525).

Alternatively, if it is determined that the broadcast viewing authority does not exist, the mobile terminal 100 determines that the selected channel is the authority restricted channel and then determines whether preview authority for the selected channel exist (S513).

If it determined that the preview authority does not exist (S513), the mobile terminal 100 displays an image for the purchase of the selected channel on the display 151 (S519) and executes a channel purchase procedure (S521).

Image configuration for the selected authority restricted channel is explained in detail with reference to FIGS. 7A to 7E as follows. FIGS. 7A to 7E are views of screens for selecting an authority restricted channel in a mobile terminal according to one embodiment of the present invention.

Figure 7A:
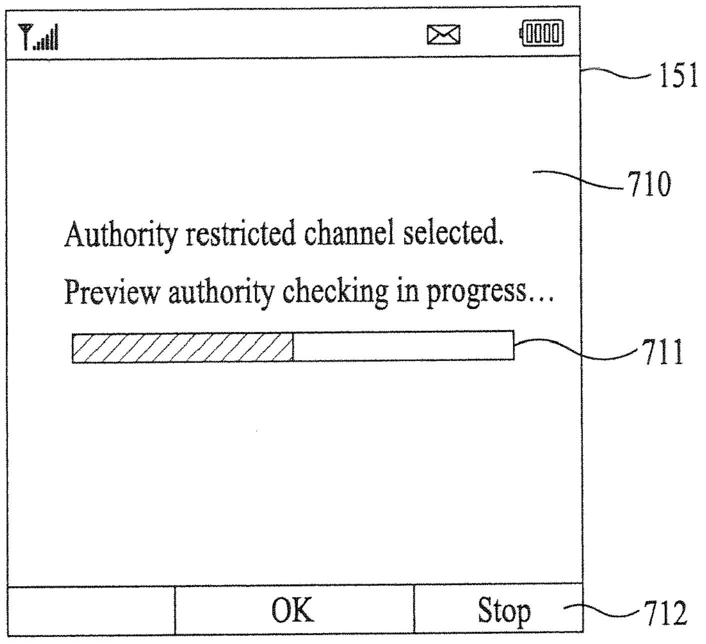
FIGS. 7A to 7E are views of screens for selecting an authority restricted channel in a mobile terminal according to one embodiment of the present invention.

Referring to FIG. 7A, if a user selects an authority restricted channel, the mobile terminal 100 determines whether a preview authority for the selected channel exists. The mobile terminal 100 is able to use a progressive bar 711 to inform the user of the progress extent of the preview authority determination. Alternatively, if the preview authority determination proceeds in the background, the image 710 shown in FIG. 7A may not be displayed on the screen.

If 'Stop' 712 is selected in the course of determining the preview authority, as shown in FIG. 7A, the mobile terminal 100 stops the preview authority determination. Moreover, the terminal 100 may go back to a channel list display.

Figure 7B:
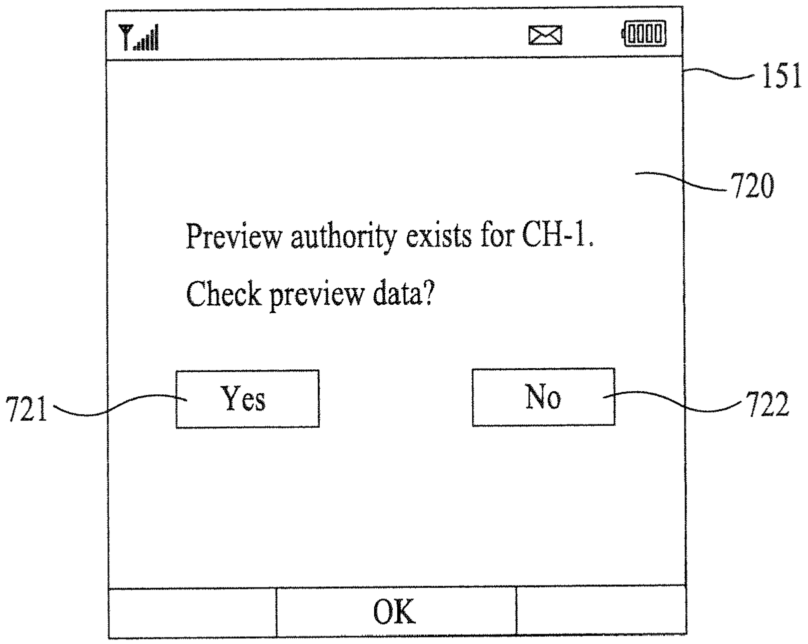

Referring to FIG. 7B, if it is determined that the preview authority for the selected channel exists, the mobile terminal 100 outputs an image 720 for enabling a user to select a presence or non-presence of channel relevant data while informing the user that the preview authority for the selected channel exists. Alternatively, when the channel relevant data is directly output regardless of the presence or non-presence of the channel relevant data, the image 720 in FIG. 7B may not be displayed on the screen.

If it is determined that the preview authority for the selected channel does not exist, the mobile terminal 100 outputs an image for direct channel purchase.

Figure 7C:
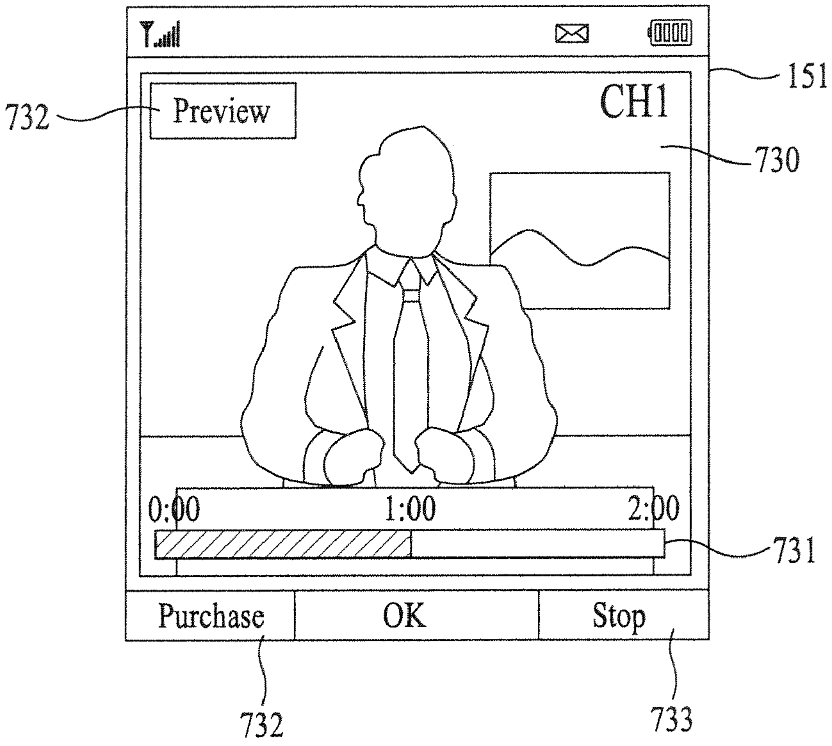

If 'Yes' 721 is selected, the mobile terminal 100 outputs the channel relevant data 730 to the screen illustrated in FIG. 7C. The terminal 100 displays an identification indicator 'preview' 734 for indicating that a currently output broadcast data is channel relevant data on a prescribed area of the image. The mobile terminal 100 displays a bar 731 indicating the portion of the channel relevant data that has been output. The identification indicator can be provided one of various means, such as an icon, a symbol, an image, or text.

If 'Purchase' 732 is selected in FIG. 7C, the mobile terminal 100 stops the output operation of the channel relevant data and then outputs an image for the channel purchase. If 'stop' 733 is selected in FIG. 7C, the terminal 100 stops the output operation of the channel relevant data and then performs a channel list display operation according to a selection made by a user.

Figure 7D:
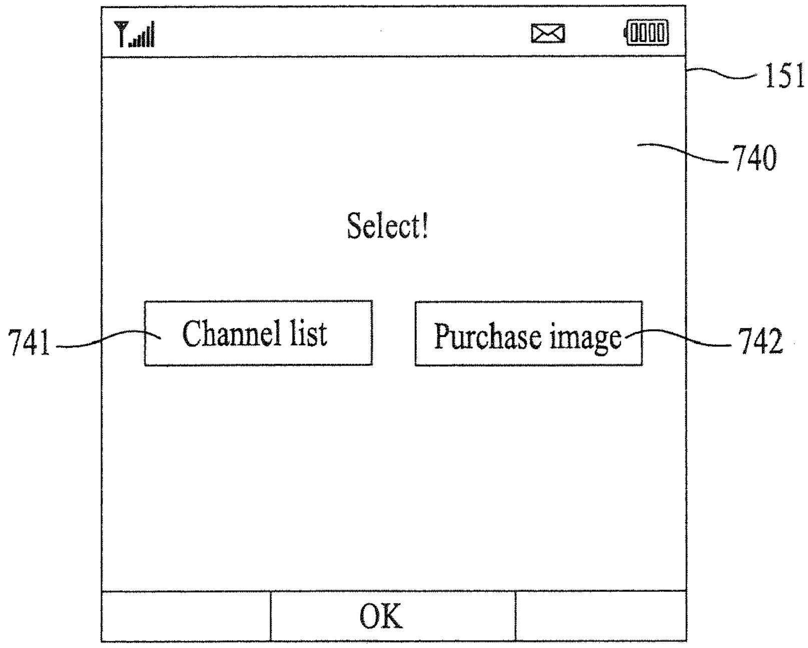

If 'No' 722 is selected, the mobile terminal 100 outputs an image 740 for enabling a user to select 'Channel list view' 741 or 'Purchase image output' 742, as illustrated in FIG. 7D.

Figure 7E:
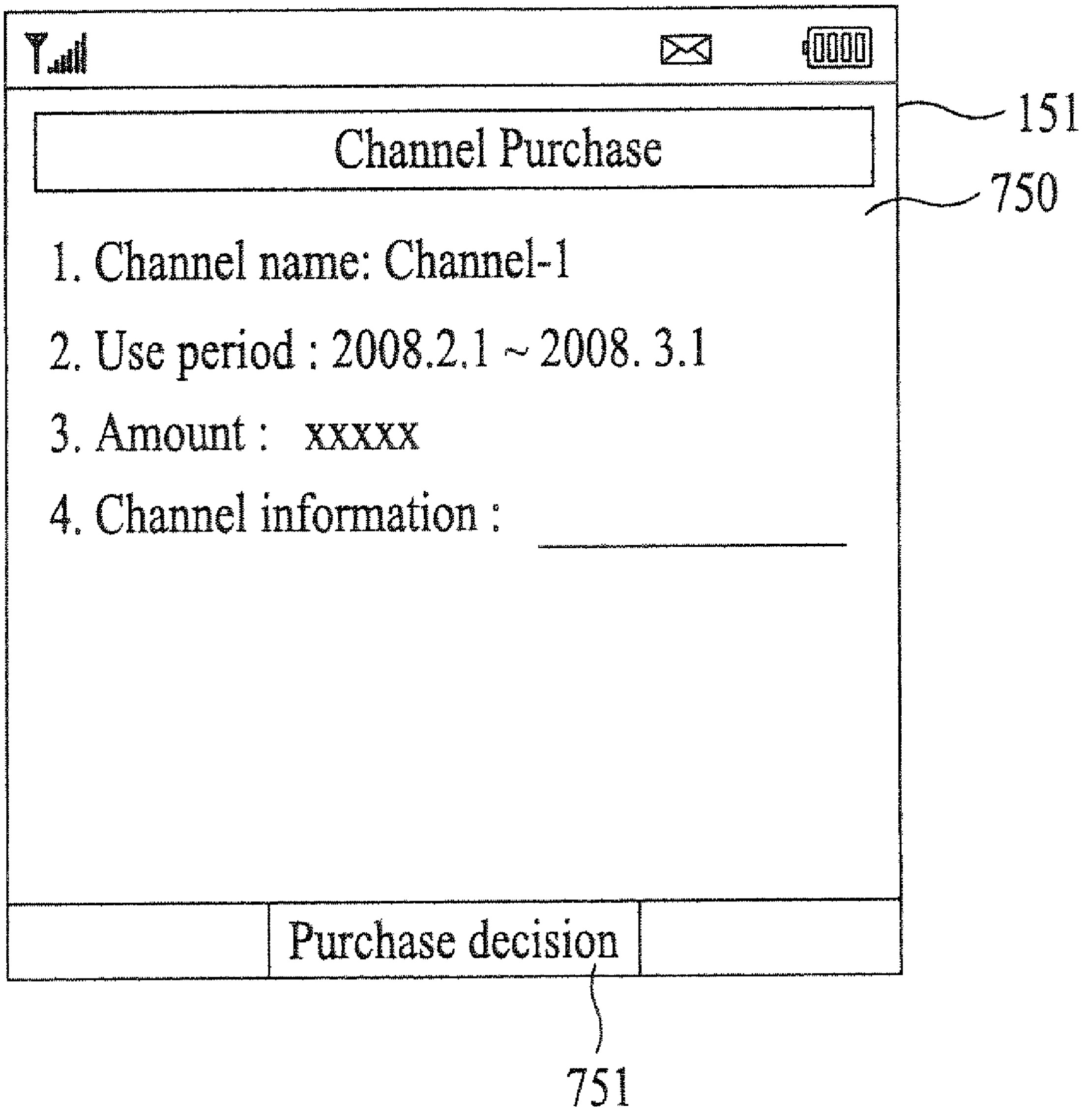

Therefore, if the 'Channel list' 741 is selected in FIG. 7D, the mobile terminal 100 displays a channel list image 750 (FIG. 7E). If the 'purchase image' output 742 is selected in FIG. 7D, the mobile terminal 100 displays an image 750 for a channel purchase.

Referring to FIG. 7E, the image 750 for the channel purchase can contain various kinds information required for the purchase, such as a channel name, a channel available period, a channel purchase amount, and channel information. If 'Purchase decision' 751 is selected in FIG. 7E, the mobile terminal 100 performs a purchase operation for the selected channel.

Figure 8A:
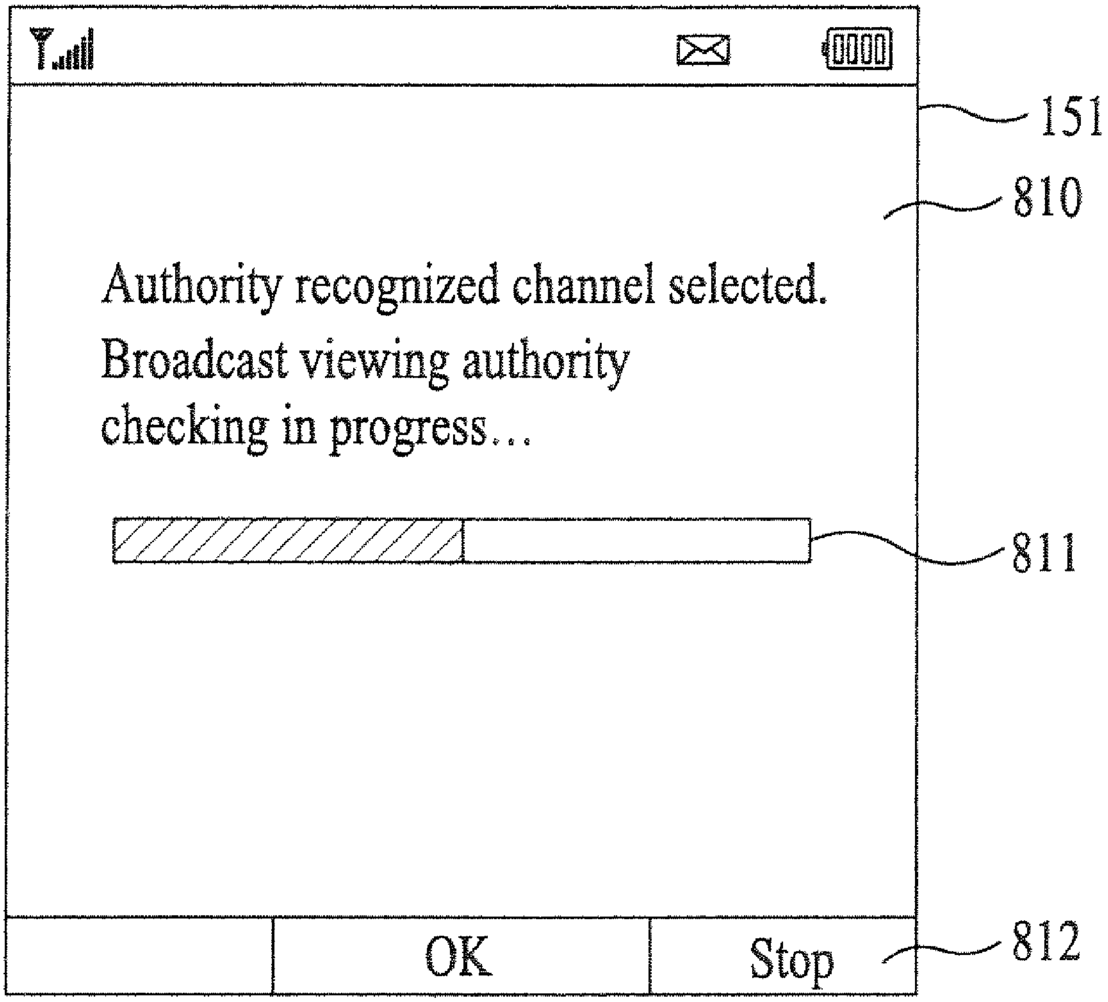
FIGS. 8A to 8C are views of screens for selecting an authority recognized channel in a mobile terminal according to one embodiment of the present invention.
Figure 8B:
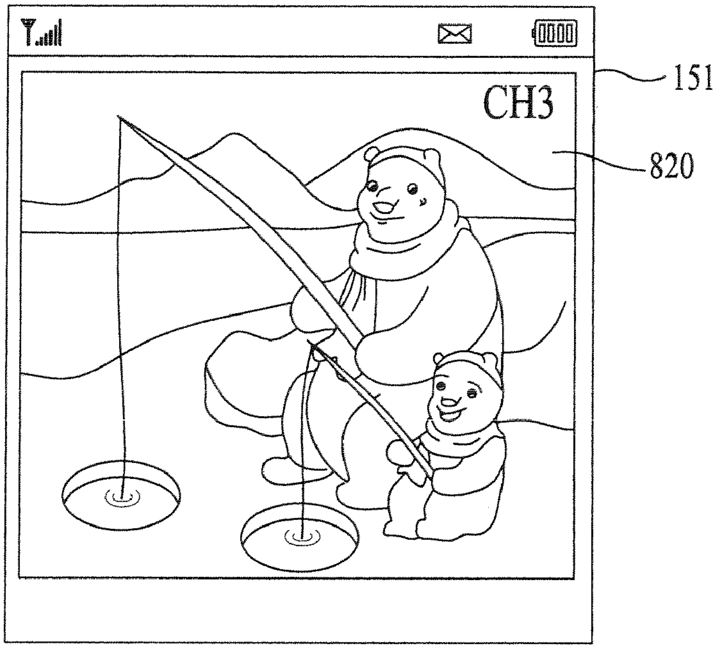
Figure 8C:
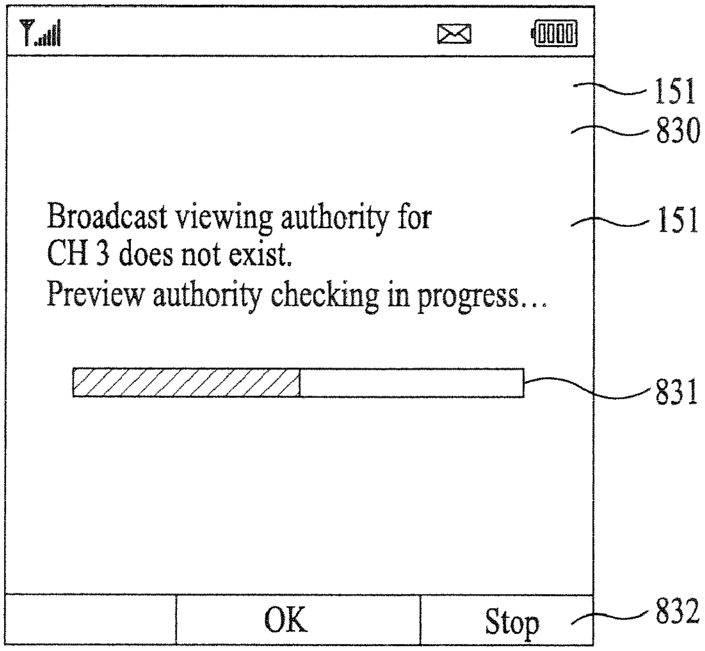

Selection of an authority recognized channel is explained in detail with reference to FIGS. 8A to 8C. FIGS. 8A to 8C are views of screens for selecting an authority recognized channel in a mobile terminal according to one embodiment of the present invention.

Referring to FIG. 8A, if a user selects an authority recognized channel, the mobile terminal 100 determines whether a broadcast viewing authority for the selected channel exists. The mobile terminal 100 may use a progressive bar 811 to inform the user of the progress of the broadcast viewing authority determination. Alternatively, if broadcast viewing authority determination proceeds in the background, the image shown 810 in FIG. 8A may not displayed on the screen.

If 'Stop' 812 is selected in the course of determining the broadcast viewing authority, as shown in FIG. 8A, the mobile terminal 100 stops the broadcast viewing authority determination. Moreover, the mobile terminal 100 may go back to a channel list display.

Referring to FIG. 8B, if the broadcast viewing authority for the selected channel exists, the terminal 100 is able to output broadcast data provided on the selected channel, Referring to FIG. 8C, if the broadcast viewing authority for the selected channel does not exist, the mobile terminal 100 recognizes the selected channel as an authority restricted channel and then determines a preview authority for the selected channel. The mobile terminal 100 may use a progressive bar 831 to indicate the progress of the preview authority determination. Alternatively, if the preview authority determination proceeds in the background, the image 830 shown in FIG. 8C may not be displayed on the screen.

According to one embodiment of the present invention, the above-described broadcasting control method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, and optical data storage devices, and also include carrier-wave type implementations, such as transmission via Internet. The computer can include the controller 180 of the mobile terminal 100.

Accordingly, the present invention provides the following effects and/or advantages.

First of all, the present invention provides a user with channel relevant data before making a decision to purchase a channel.

Secondly, the present invention provides channel relevant data of a channel having a preview authority only for making a decision for a channel purchase.

Thirdly, the present invention provides broadcast data provided as channel relevant data on a current channel for making a decision for a channel purchase, thereby providing a user with data necessary for a channel purchase.

It will be apparent to those skilled in the art that various modifications and variations can be made in a mobile terminal capable of performing video communication using real-time data according the present invention without departing from the spirit or scope of the inventions. Therefore, it is intended that the present invention covers the modifications and variations of this invention provided they come within the scope of the appended claims and their equivalents.

What is claimed is:

1. A mobile terminal, comprising:
- a user input unit configured to receive user input and to generate a signal to select a broadcast channel in response to the user input;
- an output unit for outputting data;
- a first identity device configured to store information associated with preview authority on each of at least one broadcast channel;
- a second identity device configured to store information associated with broadcast viewing authority on each of at least one broadcast channel; and
- a controller configured to:
  - determine whether preview authority exists for the selected broadcast channel using the information associated with the preview authority stored in the first identity device when the selected broadcast channel is an authority-restricted channel;
  - control the output unit to output preview data related to the selected broadcast channel for a predetermined time when the preview authority exists;
  - control the output unit to display an image for purchasing of the selected broadcast channel after outputting the preview data for the predetermined time;
  - determine whether broadcast viewing authority exists for the selected broadcast channel using the information associated with the broadcast viewing authority stored in the second identity device when the selected broadcast channel is not the authority-restricted channel; and
  - determine that the selected broadcast channel is the authority-restricted channel when the broadcast viewing authority for the selected broadcast channel does not exist.

2. The mobile terminal of claim 1, wherein the authority-restricted channel comprises a pay channel not purchased.

3. The mobile terminal of claim 1, wherein the preview authority comprises an authority for providing age-restricted data associated with the selected broadcast channel according to a viewing age restriction.

4. The mobile terminal of claim 1, wherein the preview data related to the selected broadcast channel comprises at least broadcast data currently provided on the selected broadcast channel or contents separately produced for preview.

5. The mobile terminal of claim 1, wherein the controller is further configured to control the output unit to display the image for purchasing of the selected broadcast channel without outputting the preview data related to the selected broadcast channel if the preview authority on the selected broadcast channel does not exist.

6. The mobile terminal of claim 1, wherein the controller is further configured to control the output unit to output broadcast data provided for the selected broadcast channel if the broadcast viewing authority for the selected broadcast channel exists.

7. The mobile terminal of claim 1, wherein at least one of the first or second identity devices is detachably attached to the mobile terminal.

8. The mobile terminal of claim 1, wherein the controller controls the output unit to display a broadcast channel list indicating a presence or non-presence of an authority-restricted channel for at least one broadcast channel, wherein the user input unit facilitates selection of one of the at least one broadcast channels displayed on the list.

9. The mobile terminal of claim 8, further comprising:

a wireless communication unit for receiving data associated with broadcast information and authority-restricted channel information, wherein the controller determines a presence or non-presence of an authority restriction for each of the at least one broadcast channel using the received data associated with the authority-restricted channel information and information indicating a presence or non-presence of a purchased broadcast channel.

10. A method for previewing broadcast data on a mobile terminal, the method comprising:

selecting a broadcast channel;

determining whether the selected broadcast channel is an authority-restricted channel;

determining whether a broadcast viewing authority exists for the selected broadcast channel using information associated with broadcast viewing authority when the selected broadcast channel is not the authority-restricted channel and determining that the selected broadcast channel is the authority-restricted channel when the broadcast viewing authority for the selected broadcast channel does not exist;

determining whether preview authority exists for the selected broadcast channel using information associated with preview authority when the selected broadcast channel is the authority-restricted channel;

outputting preview data associated with the selected broadcast channel for a predetermined time when the preview authority exists; and displaying an image for purchasing of the selected broadcast channel after outputting the preview data for the predetermined time, wherein the information associated with preview authority is stored in a first identity device and the information associated with broadcast viewing authority is stored in a second identity device.

11. The method of claim 10, further comprising:

displaying the image for purchasing of the selected broadcast channel without outputting the preview data associated with the selected broadcast channel if it is determined that the preview authority on the selected broadcast channel does not exist using the information associated with preview authority.

12. The method of claim 10, wherein the authority-restricted channel comprises a pay channel not purchased.

13. The method of claim 10, further comprising:

outputting broadcast data associated with the selected broadcast channel when the broadcast viewing authority for the selected broadcast channel exists.

14. The method of claim 10, further comprising:

displaying a broadcast channel list including at least one broadcast channel, in which a presence or non-presence of the authority-restricted channel is indicated for the at least one broadcast channel; and receiving a selection of one of the at least one broadcast channels displayed on the broadcast channel list.

* * * * *